March 15, 1966  T. W. MARTINEK ETAL  3,240,295
MOTION DAMPING DEVICE

Filed Nov. 28, 1962  3 Sheets-Sheet 1

INVENTORS.
THOMAS W. MARTINEK
DONALD L. KLASS
BY
*Edward H. Lang*
ATTORNEY.

March 15, 1966 T. W. MARTINEK ETAL 3,240,295
MOTION DAMPING DEVICE
Filed Nov. 28, 1962 3 Sheets-Sheet 2

INVENTORS.
THOMAS W. MARTINEK
DONALD L. KLASS
BY Edward H. Long
ATTORNEY.

March 15, 1966 T. W. MARTINEK ETAL 3,240,295
MOTION DAMPING DEVICE
Filed Nov. 28, 1962 3 Sheets-Sheet 3

INVENTORS.
THOMAS W. MARTINEK
DONALD L. KLASS
BY
*Edward H. Fang*
ATTORNEY.

United States Patent Office 3,240,295
Patented Mar. 15, 1966

3,240,295
MOTION DAMPING DEVICE
Thomas W. Martinek, Crystal Lake, and Donald L. Klass, Barrington, Ill., assignors to Union Oil Company of California, Los Angeles, Calif., a corporation of California
Filed Nov. 28, 1962, Ser. No. 240,650
13 Claims. (Cl. 188—88)

This invention relates to motion damping devices, and specifically to damping devices or shock absorbers which employ a field-responsive fluid to impede relative movement of movable members to damp motion.

Friction type damping devices, and those which are called hydraulic damping devices are in common use, and satisfactorily serve many purposes. However, there are some applications in which it is desirable that the extent of damping be variable and controlled, particularly where damping is to be applied only over a portion of the cycle of an oscillating or reciprocating body. In accordance with this invention, such control is achieved by the use of a hydraulic shock absorber or damping device which employs a field-responsive fluid as the damping fluid, and includes means to vary the effective bulk modulus of the field-responsive fluid, as will hereinafter more fully appear.

The term "field-responsive fluids" denotes electrofluids and magnetic fluids which respond to the presence of electric and magnetic fields by displaying a dramatic change in apparent bulk modulus. The properties of electrofluids and magnetic fluids are well known and understood. Such fluids become substantially rigid in the presence of intense fields. For example, it has been found that the pressure required to initiate the flow of such fluids through a parallel passage of about 0.01 inch can be made to reach values of the order of 50 to 100 p.s.i. per inch of passage length when intense fields are applied normal to the film of fluid.

Fluids suitable for the practice of the present invention are responsive to electric or magnetic fields, or both. The formulation of such fluids is well known, as exemplified by U.S. Patent No. 2,886,151, to W. M. Winslow. The composition and preparation of such fluids does not form a part of this invention. The effect of an applied field manifests itself as an instantaneous and reversible change in the bulk modulus of the electric field or magnetic field responsive fluid. In strong fields, the fluid undergoes a change in bulk modulus, and takes on semiplastic or solid physical properties. The applied field is magnetic and induced by the action of electromagnets in the case of magnetic fluids. Where electrofluids are used, as is preferred, an electric potential is applied transversely to the film or column of fluid. Electric potentials in the order of 100 to 6000 volts are contemplated. Since the electrofluids themselves are dielectric, it is understood that the current and power requirements are very small, say 1 milliampere. With respect to power requirements for magnetic fluid operation, the power consumed will be considerably higher, although relatively low voltages can be used.

It is, therefore, an object of this invention to provide a device whereby motion is damped. Another object of this invention is to provide an apparatus whereby damping forces are applied only during a predetermined portion of the cycle of an oscillating body. Another object of this invention is to provide an apparatus whereby the magnitude of a damping force may be varied in proportion to the displacement of an oscillating body from a predetermined point. Yet another object of this invention is to provide an apparatus whereby a damping force is varied in proportion to the pressure exerted on the damping fluid.

The invention is best described with reference to the drawings, of which:

Figure 1:
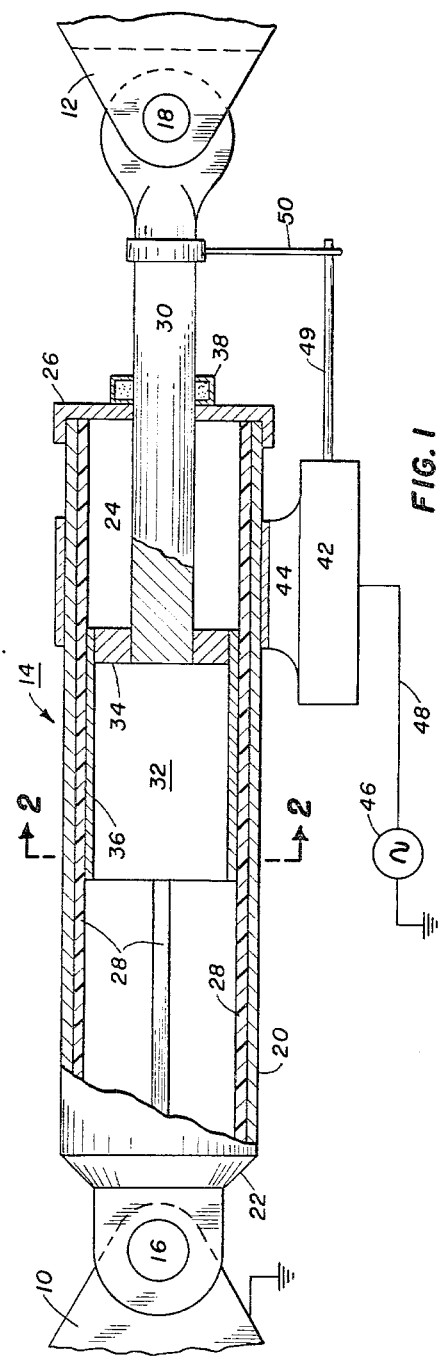
FIGURE 1 is a frontal view, partially in section, of a motion damping linkage which comprises the apparatus of this invention.

Referring to FIGURE 1, members 10 and 12, one of which will generally be fixed and the other of which will be capable of a reciprocative motion which is to be damped, are pinned to connecting-link assembly 14 by pins 16 and 18. Tube 20 comprises the body of the connecting-link assembly, or motion damper, and includes a closed end 22 and an open end 24, which open end is partially closed by cover plate 26. Within tube 20 are disposed four longitudinal stringer-like guides 28 which are small in radial thickness, preferably being not more than 0.010 inch in radial thickness. Lying axially in tube 20 is rod 30 which at one end connects to pin 18, and at the other end is secured to plunger 32. Plunger 32 consists of a support portion 34 and tube portion 36. The tube portion fits closely within the guides 28 and is thereby guided and supported for axial movement of the rod and plunger assembly with respect to tube 20.

Tube 20 is preferably made of steel, but may be fabricated of other electrically conductive materials. At least the tubular portion 36 of the plunger 32 is made of an electrically conductive material, but the whole plunger assembly, including rod 30, can be fabricated of steel. The stringer-like guides 28 are made of an electrically insulating material, which should also be resistant to wear. Hard plastic materials, such as Bakelites, may be used for this purpose. A thin fluid film of an electrofluid is maintained in the space between plunger 32 and tube 20, and also within and on each side of plunger 32. The electrofluid has a low viscosity when not under the influence of an applied electric field, the residual viscosity being adjusted, in cooperating with the spacing of the tube and plunger assembly, to provide a suitable minimum damping action when no electric field is applied. Ordinarily, the entire interior of tube 20 should be completely filled with the electrofluid. Seal 38 is made of an electrically insulating material, such as a synthetic elastomer, and serves to maintain the electrofluid within the tube and permit free movement of rod 30. It is evident that when an electric field is applied transversely to the electrofluid film occupying the space between plunger 32 and tube 20, the shear resistance of the electrofluid increases dramatically and the movement of the rod and plunger assembly with respect to the tube can be accomplished only with the application of great force.

The magnitude of force required to cause compression or expansion of the connecting-link assembly 14 depends upon the properties of the electrofluid used, the magnitude of the applied electric field, and the distance between the plunger and tube interior. The electric field is most conveniently applied by connecting one terminal of a potential source to driving member 10 (and thereby through pin 16 to tube 20) and the other terminal of the potential source to driven member 12 (and thereby to rod 30 and plunger 32). Suitable electrical insulation must be provided to prevent the connecting-link assembly from being shorted out by the frame of the machine in which it is connected. It will be understood that alternate structures may be used to provide more convenient electrical insulation. For example, tube 20 may be grounded through member 10, and an electrical conductor may connect to tube 36 of plunger 32, and pass outwardly through rod 30 in insulated relationship therewith. Supporting portion 34 of plunger 32 may be fabricated of an electrically insulating material, so that the electrofluids may be energized by applying potential between the insulated conductor and ground. The magnitude of the applied voltage may be in the order of 100 to 6000 volts, and is limited only by the dielectric strength of the film of electrofluid maintained between the tube and plunger.

Figure 2:
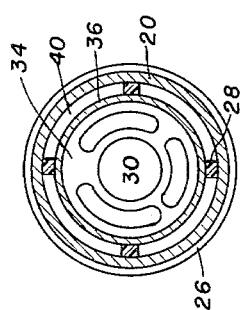
FIGURE 2 is a view in the direction 2—2 of FIGURE 1.

FIGURE 2 shows an embodiment of the invention in which the supporting portion 34 of plunger 32 is weblike to provide flow of fluid through the supporting portion of the plunger. This construction greatly reduces the dampening effect of the linkage, and is especially appropriate where the residual viscosity of the electrofluid would of itself provide an undesirably great dampening when the electrofluid is not energized. This construction also permits the radial thickness of the annular space 40 to be reduced to an absolute minimum, as little as 0.003 inch. By using such small spacing, the device can still achieve considerable damping under the influence of a relatively small electric potential. The support portion 34 of plunger 32 can be made solid, in which case the distance between the tube 20 and plunger 32 should be increased to permit minimum damping in the absence of an applied electric potential. When an electric potential is applied, very great dampening is nevertheless obtained, because the plunger acts as a piston trapping the incompressible electrofluid, and relative movement of the tube and plunger is prevented not only by the bonding achieved between the plunger and tube, but also because the electrofluid is rendered semi-solid in the space between the plunger and tube, and must of course be displaced through this space in order to permit the flow of fluid essential to movement of the plunger.

Figure 3:
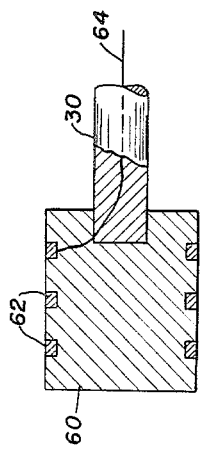
FIGURE 3 is a sectional view of a plunger and rod assembly which may be used in conjunction with the apparatus of FIGURE 1, when magnetic fluids are employed.
Figure 6:
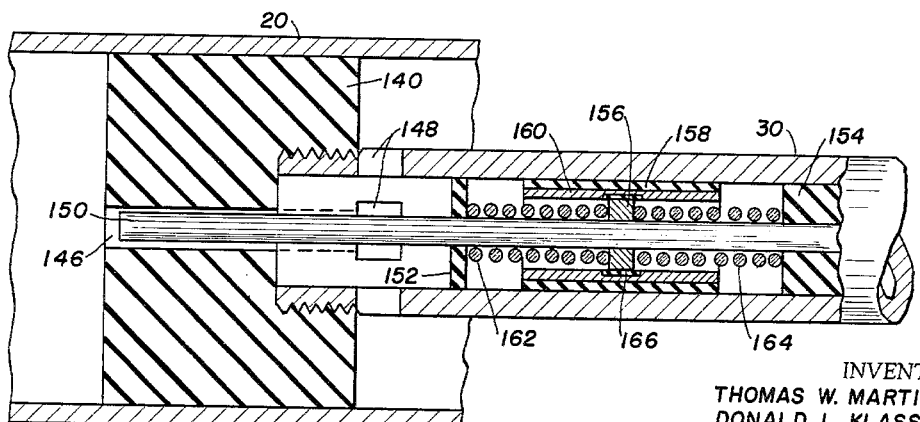
FIGURE 6 is a sectional view of another alternate circuit control system.

It will be understood that electrofluids and magnetic fluids, when under the influence of intense fields, tend to secure together normally movable elements which are separated by the film of fluid. Hence, considerable damping of motion is effected even in the absence of substantial compression of the electrofluid or magnetic fluid on either side of the plunger assembly. Where the plunger assembly is provided with openings, as shown in FIGURE 2, it is this bonding effect of the field-responsive fluid which is primarily relied upon. In embodiments such as shown in FIGURE 3, where no such apertures are provided, damping is achieved primarily by compression of the field-responsive fluid and impedance of flow of fluid through space 40. It will be understood that linkages of alternate construction, such as depicted in FIGURE 6, depend entirely upon compression of the field-responsive fluid and restriction of fluid flow, since no field induced bonding of the plunger to the tube is obtained, the plunger and tube being in direct contact and no field being applied transversely of the juncture of the tube and plunger.

Referring to FIGURE 3, plunger body 60 connects to rod 30, and is made of magnetic iron. A plurality of coils 62 are placed around the periphery of the plunger in slots provided therefor. Electrical connection is made to the ground by conductors 64 and by rod 30 which is electrically connected to the other terminal ends of the coils, which may be placed either in parallel or in series. The coils produce a magnetic flux when energized and thus increase the shear resistance of the magnetic fluid film disposed between the plunger and tube. The tube should be made of magnetic material when magnetic fluids are utilized.

Referring again to FIGURE 1, circuit-control assembly 42 is supported externally of tube 20 by bracket 44. A potential source 46 connects to circuit control assembly 42 through conductor 48, and also is grounded to tube 20 through member 10. Actuating rod 49 connects to dog 50, which is supported from rod 30. Electrical connection between potential source 46 and tube 36 of plunger 32 can be made through conductor 48, circuit-control 42, connecting rod 49, dog 50, and rod 30. It will be understood that if connection is made in this way, rather than through an insulating conductor disposed within rod 30, rod 30 should be electrically insulated from member 12 and cover 26 should be fabricated of an electrically insulating material, or at least so constructed as to insulate rod 30 from tube 20.

Figure 4:
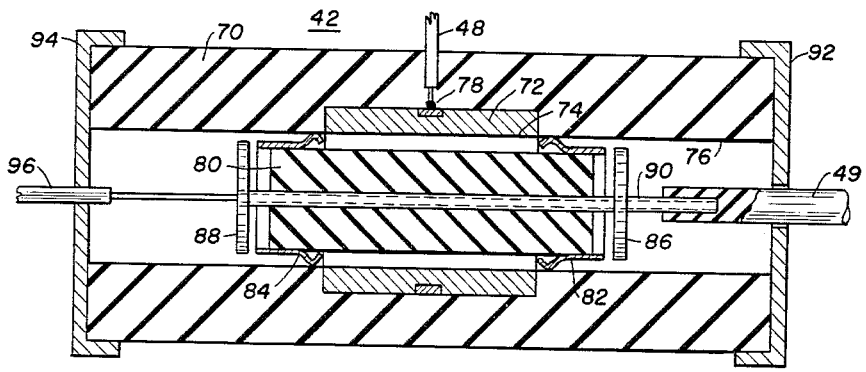
FIGURE 4 is a sectional view of a circuit-control apparatus employed with the linkage of FIGURE 1.

Circuit control 42 is shown in detailed sectional view in FIGURE 4. External tube 70 is fabricated of an electrically insulating material. A layer of electrically conductive material 72 is disposed interiorally of tube 70, preferably so that conductive surface 74 of layer 72 is flush with insulating surface 76 of tube 70. Layer 72 is preferably fabricated of a conductive material having a substantial electrical resistance. Electrical connection is made by means of conductor 48 and conductive ring 78 which is disposed at the center of conductive layer 72. Internal tube 80 is also fabricated of an electrically insulating material, and supports terminals 82 and 84 at opposite ends thereof. This pair of terminals is spaced at an axial distance greater than the axial length of layer 72, whereby the internal tube 80 may be positioned so that neither terminal 82 nor 84 will contact conductive surface 74, and in any event only one of the terminals will contact conductive surface 74. Terminals 82 and 84 extend axially of tube 80 a short distance, to permit contact between a second pair of terminals 86 and 88, and terminals 82 and 84, respectively, when conductive rod 90, upon which terminals 86 and 88 are mounted, is reciprocated. A pair of electrically insulating cover plates 94 and 92 serve as dust covers. Where direct electrical connection is to be made to rod 30, connecting rod 49 can be made of an electrically conductive material. Alternatively, connecting rod 49, which drives electrically conductive rod 90 in response to motion of rod 30 of the motion damping connecting linkage, is made of an electrically insulating material. In this case a suitable electrical conductor 96 is provided and conductive rod 90 is made hollow, whereby the rod 90 can slide in relation to conductor 96, which makes electrical connection to rod 90 and therefore to terminals 86 and 88.

In operation, assuming circuit control 42 is supported by bracket 44 as shown in FIGURE 1, and connecting rod 49 connected to plunger rod 30, with electrical connection being made also by means of conductor 48, it will be evident that there is some position of plunger 32 with respect to tube 20 at which internal tube 80 of the circuit control will rest in the central position shown, whereby there is no connection between terminals 82 or 84 and conductive surface 74. In this instance, the field-responsive fluid, whether an electrofluid or a magnetic fluid, will exist at its residual or normal viscosity. Movement of the plunger 32 to the left will result in movement of terminal 86 to contact terminal 82, and thereafter terminal 82 will contact conductive surface 74 at a point remote from conductor 48. If conductive layer 72 is of some suitable resistance, a field will be applied to the field-responsive fluid and the bulk modulus of the field-responsive fluid increased to some value. As motion of the plunger assembly 32 continues, terminal 82 will continue to slide to the left, approaching conductor 48, decreasing the resistance between terminal 82 and conductor 48, and increasing the magnitude of the applied field. When plunger 32 reaches the limit of its motion, and reverses direction, contact between terminal 86 and terminal 82 will be broken, and the field-responsive fluid will immediately revert to its normal or residual viscosity. Terminal 88 will then contact terminal 84 but terminal 84 will be a considerable distance to the left of conductive surface 74. Accordingly, the field-responsive fluid will remain at its residual viscosity until the reciprocative movement of the plunger has just passed the central position, whereupon terminal 84 will contact conductive surface 74 to apply a field to the field-responsive fluid. It will therefore be apparent that the field-responsive fluid will remain at its residual viscosity at all times when the motion of the plunger is towards the predetermined null or central position, as established by the position and length of the various members and linkages. It will further be apparent that a bulk-modulus-increasing field will be applied to the field-responsive fluid whenever motion is in a direction away from the predetermined or null position. Also, by fabricating the layer 72 to have a proper resistance, the magnitude of the applied field may be varied in response to the distance of displacement of the plunger from the predetermined position. With the circuit control design shown in FIGURE 4, the magnitude of the applied field will increase with distance or displacement of the plunger from the predetermined central position.

Certain modifications of the structure specifically described will at once be apparent to those skilled in the art. For example, where elements have been described as fabricated of an electrically insulating material, the elements may be made of a conductive material provided electrical insulation is provided at critical locations. Further, conductor 48 can be made to connect to the extreme ends of conductive layer 74, rather than to the center, whereby the applied field will have a maximum value upon initial contact between terminal 82 or 84 and layer 72, and the magnitude of the applied field will diminish as the displacement of the plunger from the predetermined position increases, that is, as terminal 82, for example, approaches the center of conductive surface 74. As another alternative, layer 72 may be merely conductive and of low resistivity, whereby the magnitude of the applied field will not change after connection has once been made until the direction of motion is reversed.

Figure 7:
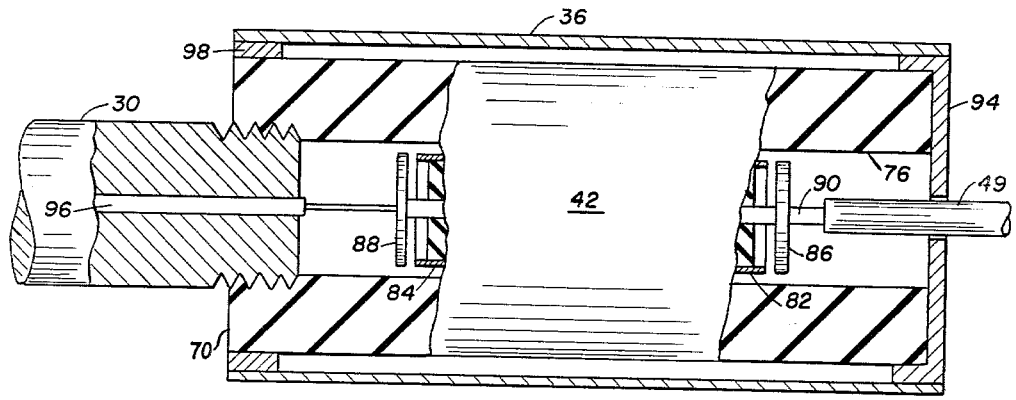
FIGURE 7 is a view, partially in section, of yet another circuit-control system.

In FIGURE 7 an embodiment is shown wherein the control circuit is disposed within the plunger assembly, rather than externally of tube 20, and in fact forms a support for tube 36 of the plunger. Referring to FIGURE 7, a modified structure is shown wherein tube 36 of plunger assembly 32 is supported externally of external tube 70 of circuit control 42, which, in turn, is connected directly to rod 30. Cover plate 94 supports one end of tube 36, and an electrically insulating ring 98 is provided to support the other end of tube 36. The cover plate and ring receive support from external tube 70. Connecting rod 49, which is shown in FIGURE 1 as being connected to rod 30, will instead be secured to closed end 22 of tube 20 when the plunger assembly (which includes the circuit control 42) is disposed within tube 20. In this embodiment, connecting rod 49 should be fabricated of an electrically insulating material, conductor 48 may be connected directly to tube 36, and power may be supplied to the circuit control by means of a conductor such as conductor 96 (which may be disposed within rod 30).

Figure 5:
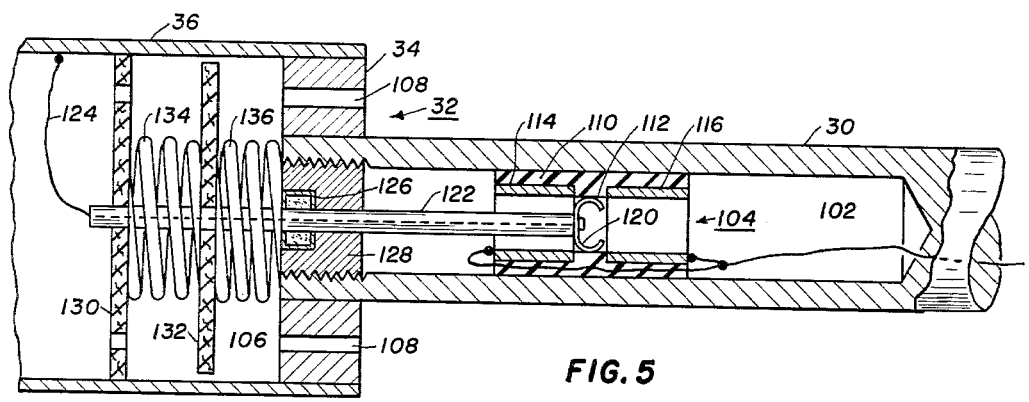
FIGURE 5 is a view of an alternate circuit-control system.

Referring to FIGURE 5, an alternate circuit control is shown which is not dependent upon the existence of a predetermined position or null point. Instead, the circuit control of FIGURE 5 operates to apply a field to the field-responsive fluid when there is movement in any direction, but to apply no field in the absence of movement. Plunger assembly 32 is mounted on rod 30 and comprises support 34 and tube 36, as does the plunger shown in FIGURE 1. Rod 30, however, is made hollow at 102 and circuit control assembly 104 is provided within the hollow portion of the rod, and a circuit control actuating means designated generally 106 is disposed within the hollow portion of plunger 32. Support member 34 is provided with apertures 108. Circuit control 104 consists of a tubular, electrically insulating support 110, which includes internal lip 112 and two tubular resistance elements 114 and 116 supported internally of tubular support 110. Terminal 120 is supported by electrically insulating rod 122, and connects to electrically insulated conductor 124. The normal position of terminal 120 is in contact with lip 112, and not in contact with resistance elements 114 or 116. Rod 122 is slidably supported by fluid seal 126 and seal retainer 128, and by perforate fiber disc 130. Fiber disc 132 is rigidly secured to rod 122, and is slightly smaller than the internal diameter of tube 36. Springs 134 and 136 yieldably urge disc 132 and rod 122 to a neutral or equilbrium position, at which position terminal 120 does not contact either resistance element 114 or 116. However, upon movement of the rod and plunger assembly, fluid pressure moves disc 132 against springs 134 and 136 to move terminal 120 into contact with either resistance element 114 or resistance element 116, depending upon direction of motion of the rod and plunger assembly. When electrical connection is made with the remote terminals of resistance elements 114 and 116, the resistance in the control circuit will decrease in proportion to the displacement of rod 122, which, in turn, is proportional to the magnitude of the pressure exerted upon the field-responsive fluid. On the other hand, where electrical connection is made to the adjacent ends of resistance elements 114 and 116, the effect will be opposite, that is, the magnitude of the applied field will decrease in proportion to the pressure applied to the field-responsive fluid.

Referring to FIGURE 6, an alternate structure is shown wherein the field is applied internally of the plunger assembly, rather than between the plunger assembly and tube 20. Rod 30 connects to cylindrical block 140, which is slidably mounted on tube 20. It will be noted that in this embodiment the stringers 29 of FIGURE 1, which served to separate the plunger 32 from tube 20, are not necessary and are omitted. Thus, the space between tube 20 and block 140 is merely sufficient to permit the block to slide within the tube. Block 140 is provided with an internal, axial openings 146, which, in cooperation with ports 148 in rod 30, permit flow of fluid from one side of block 140 to the other, so that movement of the block with respect to tube 20 is possible to the extent of fluid flow through axial passage 146. Disposed within passage 146 is rod 150, which is supported from rod 30 by means of electrically insulating seal 152 and electrically insulating sleeve 154. Rod 150 is slidable within the seal and sleeve, and carries terminal ring 156. Electrically insulating sleeve 158 supports cylindrical resistance element 160 in insulated relationship with respect to rod 30. Rod 150 and terminal ring 156 are maintained in a neutral position by means of springs 162 and 164. An electrically insulating spacer ring 166 is provided so that contact is not made with the resistance element so long as terminal 156 is in the neutral position. Electrical connection is made to each of the opposed ends of resistance element 160 by means of conductors which are not shown. These conductors will preferably extend within rod 30 to some fixed support to which the rod connects. Potential is applied between the conductor and rod 30, both of which may be fixed rather than oscillating, whereby construction is simplified. The oscillating member, the motion of which is to be damped will then be connected to tube 20 as shown in FIGURE 1. The electric potential is applied between cylindrical block 140 and rod 150, whereby flow of electrofluid through opening 146 is impeded. Depending upon the direction of flow of fluid, rod 150 will tend to move axially in its supports. This, in turn, moves terminal 156 to contact resistance element 160. In this manner the magnitude of the applied potential is varied, or discontinued altogether. Again, it will be obvious to those skilled in the art that by simple modification the device can be made to either increase or decrease the applied potential in response to the flow of fluid through opening 146, which, in turn, is responsive to the pressure exerted upon the fluid by the cylindrical block 140. In this manner, the magnitude of the damping effect can be varied.

Figure 9:
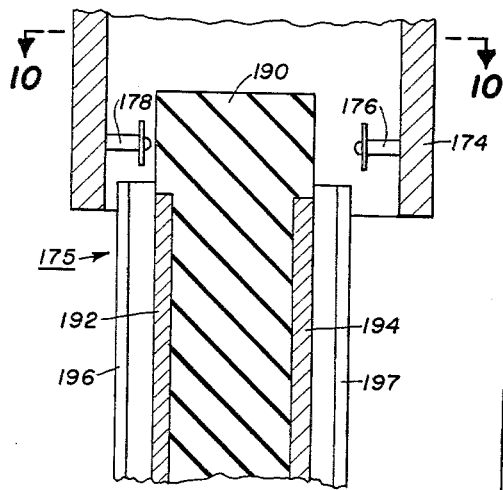
FIGURES 9 and 10 are detailed representations of the circuit control device employed in the apparatus of FIGURE 8.
Figure 8:
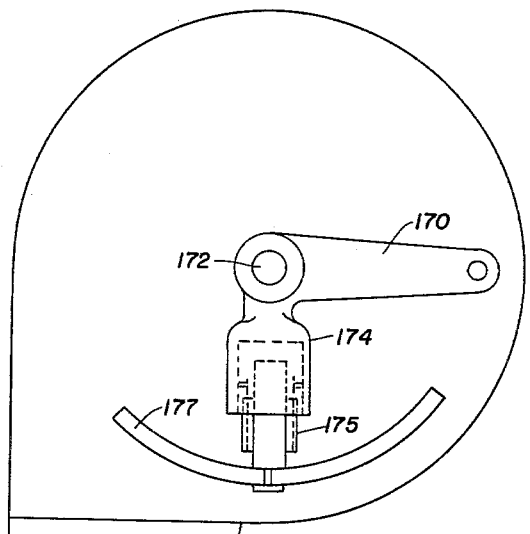
FIGURE 8 is a view of a device employed to damp rotary motion.
Figure 10:
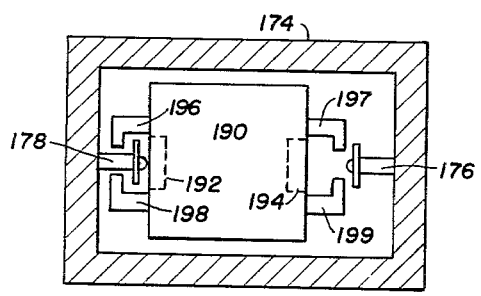

Referring to FIGURE 8, a device for damping rotary motion is shown. The damping device takes the form of a conventional electrofluid coupling or magnetic fluid coupling, and is not shown in detail. Couplings as shown, for example, in U.S. Patent No. 2,886,151 to W. M. Winslow are suitable and may be used. Arm 170 of the device is connected to input shaft 172, and includes an enlarged stub 174 in which rider 175 is slidable. Rider 175 is secured slidably to eliptical cam surface 177. Referring now to FIGURES 9 and 10, the stub and rider assembly are shown in detail to comprise a circuit control assembly. Stub 174 supports terminals 176 and 178 on opposite sides of electrically insulating block 190. Block 190 supports resistance elements 192 and 194 which are disposed on opposite surfaces thereof. Four angular arms designated 196, 197, 198, and 199, respectively, are positioned to form T-shaped grooves adapted to accommodate the T-shaped terminals 176 and 178. In operation, when arm 170 is in the predetermined null position as shown in FIGURE 8, rider 175 is in a lower position at which neither terminal 176 or 178 will contact resistance element 192 or 194. However, as arm 170 is rotated, one of the two contacts will bear against insulating support 190 to cause the rider 175 to move along the eliptical cam 177, the shape of the cam being such as to cause the slide assembly to move upward into stub 174, whereby terminal 178 will contact resistance element 192, assuming rotation of arm 170 to be in a counter-clockwise direction. As rotation continues, motion of the contact along the resistance element will continue due to the curvature of the eliptical track 177. In this manner, the magnitude of the field applied to the electrofluid or magnetic fluid coupling is controlled. Upon reversal of direction of rotation, it will be evident that terminal 178 will break connection with the resistance element 192, but will contact the internal surface of angle pieces 196 and 198, returning the rider 175 eventually to the neutral position shown in FIGURE 8. At this point, or just before this point, terminal 178 will slip out from under angle pieces 196 and 198, whereupon continued motion of arm 170 will cause terminal 176 to enter under angle pieces 197 and 199, and contact electrical resistance element 194 and the rider 175 again moves upward into stub 174. It will be evident that the net effect is that the field-responsive fluid is energized only when rotary motion is in a direction away from the predetermined position, and that the magnitude of the applied potential will increase or decrease in proportion to the displacement of the predetermined position, depending upon where electrical connection is made to resistance elements 192 and 194, as before explained with respect to FIGURE 4. As has been pointed out, while the invention has been described with respect to several specific preferred embodiments, the invention can be practiced employing various modifications of these embodiments which will be apparent to those skilled in the art.

The embodiments of the invention in which an exclusive property or privilege is claimed are defined as follows:

1. In a motion damping device comprising a pair of members supported in relatively movable relation, a field responsive fluid for impeding the relative movement of said members, between said members, and means including an electric circuit for applying an energizing field to said fluid whereby the impedance to relative movement of said memebrs is controlled, the improvement comprising an electrical resistance element, having an elongated surface, supported in fixed relation to one of said members, a first terminal adapted to contact said surface and supported for movement relative thereto, a second terminal supported in fixed relation to the other member and in a position to contact and push said first terminal when said other member moves in one direction but not when it moves in the opposite direction, said first terminal and elongated surface being positioned so that when said pair of members are in a predetermined position, said second terminal is about to contact said first terminal, said first terminal is out of contact with said surface, and the motion of said second terminal in a direction toward said first terminal moves said first terminal into contact with said surface.

2. In a motion damping device comprising a pair of members supported in relatively movable relation, a field responsive fluid for impeding the relative movement of said members, between said members, and means including an electric circuit for applying an energizing field to said fluid whereby the impedance to relative movement of said members is controlled, the improvement comprising means in said circuit responsive to movement of said members relative to a predetermined position for applying a field of greater magnitude when said relative movement is in a direction away from said predetermined position than when said movement is toward said predetermined position, said last-mentioned means comprising a first tube fabricated of an electrically insulating material, a conductive surface supported internally of said tube, a second tube disposed internally of said first tube in axially aligned and axially movable relationship therewith, a first pair of terminals supported one at each end of said second tube in insulated relation therewith and adapted to contact said conductive surface, the distance between the terminals of said first pair being greater than the length of said conductive surface, whereby only one terminal of said pair can contact said surface at one time, a conductive rod extending through said second tube in insulated relation therewith, a second pair of terminals fixed to said rod, each adjacent to a terminal of said first pair in order to permit contact therewith but positioned so as to prevent the terminals of said second pair from contacting the terminals of said first pair simultaneously, means supporting said first tube in fixed position with respect to one of said pair of memebrs, and means connecting said rod to the other member of said pair of members for movement therewith.

3. An apparatus in accordance with claim 2 in which said surface is the surface of a resistance element and including a conductor connected to said resistance element intermediate the ends thereof.

4. A motion damping device comprising a first tube and a plunger adapted to reciprocate therein and disposed in spaced relationship thereto, a field-responsive fluid disposed in the space between the tube and plunger, means for guiding axial movement of said plunger with respect to said tubes, means for applying a field transversely of the space between the plunger and tube, the opposite ends of said plunger and tube being adapted for attachment to mechanisms which move relative to each other, means responsive to relative movement of said tube and plunger from a predetermined position for impressing a field of greater magnitude when said relative movement is in a direction away from said predetermined position than when said relative movement is toward said predetermined position, said means responsive to relative movement comprising a second tube fabricated of an electrically insulating material, a conductive surface supported externally of said second tube, a third tube disposed internally of said second tube in axially aligned relationship therewith, a first pair of electrical terminals supported one at each end of said third tube in insulated relationship therewith and shaped to contact said surface, the distance between the terminals of said first pair being greater than the length of said conductive surface, whereby only one terminal of said pair can contact said surface at one time, a conductive rod slidably extending through said third tube in insulated relationship therewith, a second pair of terminals fixed to said rod, each terminal being adjacent to a terminal of said first pair in order to permit contact therewith but positioned so as to prevent the terminals of said second pair from simultaneously contacting the terminals of said first pair, means supporting said second tube in fixed position to said plunger and means for connecting said rod to said first tube.

5. An apparatus in accordance with claim 4 in which said conductive surface is the surface of a resistance element and including a conductor connected to said resistance element intermediate the ends thereof.

6. A motion damping service comprising a first tube and a plunger adapted to reciprocate therein and disposed in spaced relationship thereto, a field-responsive fluid disposed in the space between the tube and plunger, means for guiding axial movement of said plunger with respect to said tube, means for applying a field transversely of the space between the plunger and tube, the opposite ends of said plunger and tube being adapted for attachment to mechanisms which move relative to each other, means responsive to relative movement of said tube and plunger from a predetermined position for impressing a field of greater magnitude when said relative movement is in a direction away from said predetermined position than when said relative movement is toward said predetermined position, said means responsive to relative movement comprising an electrically resistant element supported in fixed relationship with said first tube, a first terminal supported for movement relative to and adapted to contact said conductive surface, a second terminal supported in fixed relationship with said plunger and positioned to contact and push said first terminal when said first tube moves in one direction relative to said plunger, but not to contact said first terminal when said first tube moves in the opposite direction, said first terminal and said resistance element being positioned so that when said first tube and plunger are in said predetermined position and said second terminal is about to contact said first terminal, said first terminal is not in contact with said surface, and motion of said second terminal in a direction towards said first terminal moves said first terminal into contact with said resistance element.

7. In a motion damping device comprising a pair of members supported in relatively movable relation, a field-responsive fluid between said members for impeding the relative movement of said members, and means including an electrical circuit for applying an energizing field to said fluid, whereby impedance to relative movement of said members is controlled, the improvement comprising means in said circuit responsive to pressure applied to said fluid by relative movement of said members for increasing the magnitude of the field with increase in pressure applied to said fluid, said pressure responsive means including a slidable rod, spring means for yieldably retaining said rod in a predetermined position, a terminal fixed to said rod, two conductive surfaces, one of said surfaces being positioned on each side of said terminal when said rod is in said predetermined position, said terminal being positioned so that movement of said rod from said predetermined position causes said terminal to contact one of said surfaces.

8. An apparatus in accordance with claim 7 in which said two conductive surfaces are surfaces of a resistance element, and conductor means is connected to the remote ends of said elements.

9. A motion damping device comprising a linkage including a tube, a plunger member disposed within said tube in spaced relation therewith, a field-responsive fluid disposed in the space between the tube and plunger, means for guiding axial movement of the plunger with respect to the tube, means for applying a field transversely of said space between the plunger and tube, the opposite ends of said plunger and tube being adapted for attachment to a driving member and a fixed member to mechanically connect said driving and fixed members, and separate means responsive to fluid pressure generated within said tube by relative movement of said members for controlling the current in said circuit and thereby varying the magnitude of the field applied, said pressure responsive means includes a rod, spring means for yieldably retaining said rod in a predetermined position, a terminal supported by said rod, two conductive surfaces, one of said surfaces being positioned on each side of said terminal when said rod is in a predetermined position, whereby movement of said rod from said predetermined position causes said terminal to contact one of said surfaces.

10. An apparatus in accordance with claim 9 in which said two conductive surfaces are surfaces of resistance elements, and conductor means is connected to the remote ends of said resistance elements.

11. In a motion damping device comprising a pair of members supported in relatively reciprocating movable relation, a field-responsive fluid in contact with said members, and an electric circuit for applying an energizing field to said fluid whereby the impedance to relative movement of said members is controlled, the improvement comprising means in said circuit responsive to movement of either of said members in a direction away from a predetermined position for applying a field to said fluid and for interrupting said field when movement of either member is toward said predetermined position.

12. An apparatus in accordance with claim 11 in which said means varies the magnitude of said field in direct relation to the distance of movement away from said predetermined position.

13. A motion damping device comprising a tube having a closed end, a plunger member slidably disposed within said tube, a confined body of field-responsive fluid in said tube in contact with said tube and said plunger, means including an electric circuit for applying an electric field to said fluid, means in said circuit independent of said plunger, responsive to and actuated by variations in pressure within said tube between said closed end and said plunger, for controlling the magnitude of the field applied to said fluid independently of the relative positions of said tube and plunger, means for automatically closing said circuit during relative movement of said tube and plunger and means for automatically interrupting said circuit in the absence of such movement.

References Cited by the Examiner

UNITED STATES PATENTS

| | | | |
|---|---|---|---|
| 2,661,596 | 12/1953 | Winslow | 188—88 |
| 2,667,237 | 1/1954 | Rabinow | 188—88 |
| 2,846,028 | 8/1958 | Gunther | 188—88 |
| 2,891,234 | 6/1959 | Hague | 338—39 X |
| 2,973,969 | 3/1961 | Thall | 280—124 X |
| 3,059,915 | 10/1962 | Kemelhor | 188—88 X |
| 3,112,909 | 12/1963 | Suozzo et al. | 188—88 X |
| 3,147,965 | 9/1964 | Mercier | 267—64 |

FOREIGN PATENTS

| | | |
|---|---|---|
| 756,107 | 8/1956 | Great Britain. |

FERGUS S. MIDDLETON, *Primary Examiner.*

ARTHUR L. LA POINT, EUGENE G. BOTZ, MILTON BUCHLER, *Examiners.*